(12) United States Patent
Sheshaiahgari et al.

(10) Patent No.: US 10,574,822 B1
(45) Date of Patent: Feb. 25, 2020

(54) COMPUTER-BASED SYSTEMS AND METHODS CONFIGURED FOR ONE OR MORE TECHNOLOGICAL APPLICATIONS FOR THE AUTOMATED ASSISTING OF TELEPHONE AGENT SERVICES

(71) Applicant: Capital One Services, LLC, McLean, VA (US)

(72) Inventors: Srikanth Reddy Sheshaiahgari, McLean, VA (US); Jignesh Rangwala, McLean, VA (US); Lee Adcock, McLean, VA (US); Vamsi Kavuri, McLean, VA (US); Muthukumaran Vembuli, McLean, VA (US); Mehulkumar Jayantilal Garnara, McLean, VA (US); Soumyajit Ray, McLean, VA (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/571,233

(22) Filed: Sep. 16, 2019

(51) Int. Cl.
| | |
|---|---|
| *H04M 3/51* | (2006.01) |
| *H04L 12/58* | (2006.01) |
| *H04M 3/42* | (2006.01) |
| *G10L 15/22* | (2006.01) |
| *G10L 13/04* | (2013.01) |
| *G06F 17/28* | (2006.01) |
| *G10L 15/26* | (2006.01) |

(52) U.S. Cl.
CPC ........ *H04M 3/5183* (2013.01); *G06F 17/289* (2013.01); *G10L 13/043* (2013.01); *G10L 15/22* (2013.01); *G10L 15/265* (2013.01); *H04L 51/046* (2013.01); *H04L 51/08* (2013.01); *H04M 3/42059* (2013.01); *H04M 2201/39* (2013.01); *H04M 2203/404* (2013.01); *H04M 2242/12* (2013.01)

(58) Field of Classification Search
None
See application file for complete search history.

(56) References Cited

U.S. PATENT DOCUMENTS

| | | | | |
|---|---|---|---|---|
| 7,457,404 B1* | 11/2008 | Hession | .............. | H04M 3/5175 379/265.07 |
| 2009/0083380 A1* | 3/2009 | Smyth | .................... | H04L 51/04 709/206 |
| 2014/0282083 A1* | 9/2014 | Gaetano, Jr. | ............ | H04L 51/04 715/752 |

* cited by examiner

*Primary Examiner* — Antim G Shah
(74) *Attorney, Agent, or Firm* — Greenberg Traurig, LLP

(57) ABSTRACT

At least some embodiments, a system includes a memory, and a processor configured to convert an audio stream of a speech of a customer during a customer call session into customer-originated text. The customer-originated text is displayed in a first chat interface. A request from a first call center agent is sent to a second call center agent via the first chat interface to interact with the customer during the customer call session and displayed in a second chat interface. The second agent is allowed to participate in the customer call session when the second call center agent accepts the request from the first call center agent. First agent-originated text and second agent-originated text during the customer call session is merged to form a combined agent-originated text and synthesized to computer-generated agent speech having a voice of a computer-generated agent based on the combined agent-originated text communicated to the customer over the voice channel.

20 Claims, 10 Drawing Sheets

340

Customer: Hello
Agent 21: Hello, how can I help you?
Customer: I have a problem activating my credit card
Agent 21: Just a minute please
<transfer to Agent 2 by clicking AGENT 2 INVITE>
Automated Message: We recognize your credit card number from your cell number
Agent 2: What are the last four digits of the credit card
Customer: The last four digits of my credit card are 5831
Agent 2: Can you please tell me the last four digits of your social security number
Customer: The last four digits of my social security number are 6789
Agent 2: Thank you.
Automated Message: For your security and identity authentication, can you please upload a copy of your driver's license by a link that I sent by SMS to your cellphone.
Customer: I uploaded the file now
Customer Upload: Driver License
Agent 2: Thank you. I received a copy of your driver license.
Agent 2: Did I have your approval to activate your credit card
Customer: Yes, please activate my credit card
<Agent pastes Activation Disclosure here>
Automated Message: Your card ending in 5831 is now activated
Customer: Thank you, Bye ANNOTATION AGENT 2: Credit Card Successfully Activated. No issues — 230

FIG. 5

COMPUTER-BASED SYSTEMS AND METHODS CONFIGURED FOR ONE OR MORE TECHNOLOGICAL APPLICATIONS FOR THE AUTOMATED ASSISTING OF TELEPHONE AGENT SERVICES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based systems and methods for one or more novel technological applications for the automated assisting of telephone agent services.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based system that may include at least the following components of a memory and a processor. The processor may be configured to:

receive an audio stream of a speech of a customer over a voice channel of a communication network during a call that the customer placed to a call center that is associated with an entity;

establish a customer call session for the call of the customer;

convert the audio stream of the speech of the customer during the customer call session into customer-originated text;

cause to display the customer-originated text in at least one first chat interface displayed on at least one first computing device of at least one first call center agent during the customer call session;

send a request from the at least one first call center agent to at least one second call center agent via the at least one first chat interface to interact with the customer during the customer call session;

display the request in at least one second chat interface displayed on at least one second computing device of the at least one second call center agent;

allow the at least one second agent to participate in the customer call session when the at least one second call center agent accepts the request from the at least one first call center agent;

receive at least one first agent-originated text inputted by the at least one first call center agent;

receive at least one second agent-originated text inputted by the at least one second call center agent;

merge the at least one first agent-originated text and the at least one second agent-originated text during the customer call session to form a combined agent-originated text;

synthesize computer-generated agent speech having a voice of a computer-generated agent based on the combined agent-originated text;

communicate the computer-generated agent speech to the customer over the voice channel, where the customer receives a unified call experience for the entire duration of the customer call session by being unaware that the computer-generated agent speech originated from the at least one first call center agent and the at least one second call center agent; and store, in the computer memory, a chat history of the customer call session.

In some embodiments, the present disclosure provides an exemplary technically improved computer-based method that includes at least the following steps of:

receiving, by a processor, an audio stream of a speech of a customer over a voice channel of a communication network during a call that the customer placed to a call center that is associated with an entity;

establishing, by the processor, a customer call session for the call of the customer;

converting, by the processor, the audio stream of the speech of the customer during the customer call session into customer-originated text;

causing, by the processor, to display the customer-originated text in at least one first chat interface displayed on at least one first computing device of at least one first call center agent during the customer call session;

sending, by the processor, a request from the at least one first call center agent to at least one second call center agent via the at least one first chat interface to interact with the customer during the customer call session;

displaying, by the processor, the request in at least one second chat interface displayed on at least one second computing device of the at least one second call center agent;

allowing, by the processor, the at least one second agent to participate in the customer call session when the at least one second call center agent accepts the request from the at least one first call center agent;

receiving, by the processor, at least one first agent-originated text inputted by the at least one first call center agent;

receiving, by the processor, at least one second agent-originated text inputted by the at least one second call center agent;

merging, by the processor, the at least one first agent-originated text and the at least one second agent-originated text during the customer call session to form a combined agent-originated text;

synthesizing, by the processor, computer-generated agent speech having a voice of a computer-generated agent based on the combined agent-originated text;

communicating, by the processor, the computer-generated agent speech to the customer over the voice channel, where the customer receives a unified call experience for the entire duration of the customer call session by being unaware that the computer-generated agent speech originated from the at least one first call center agent and the at least one second call center agent; and storing, by the processor in a computer memory, a chat history of the customer call session.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 5 illustrates an exemplary chat history of interactions between multiple call center agents and a customer via a chat interface, in accordance with one or more embodiments of the present disclosure;

DETAILED DESCRIPTION

Figure 1:
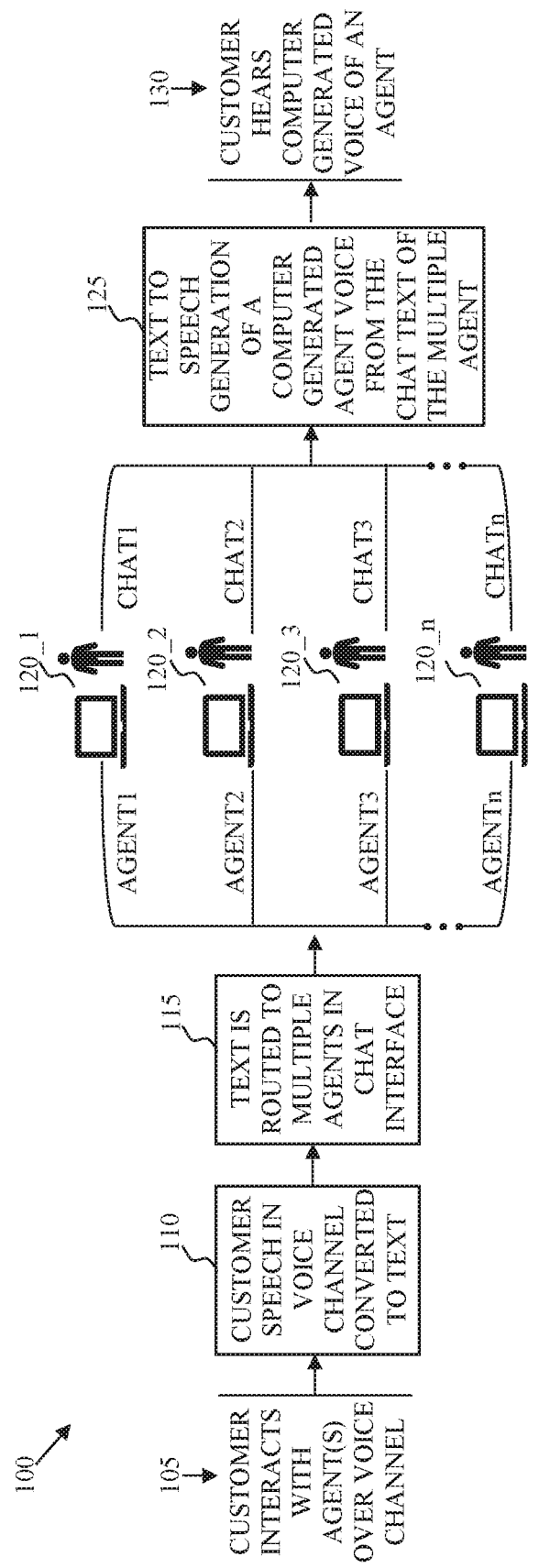
FIG. 1 depicts an exemplary system for automated assisting of telephone agent services, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein disclose methods and systems for an automated assisting of telephone agent services. When a customer calls into a call center of an entity such a financial institution, the needs of the customer may be managed by one or more call center agents during an entire duration of the customer call session. During the call, an audio stream of a speech of the customer over a voice channel may be converted into text. The customer-originated text may be displayed in a chat interface on the computing devices of respective call center agents.

In some embodiments, in response to reading the customer-originated text, a call center agent may type or input text into the chat interface to address the issues raised by customer (e.g., the reason that the customer called into the call center). The call center agent-originated text may then be converted into a computer-generated agent speech for the customer to hear. Furthermore, additional call center agents may interact with the customer via their chat interfaces. The chat text from all of the call center agents interacting with the customer may be merged and converted into computer-generated agent speech. The customer may hear the computer-generated agent speech in response, and may be completely unaware that the customer had interacted with multiple agents during the entire duration of the customer call session.

FIG. 1 depicts an exemplary system 100 for automated assisting of telephone agent services, in accordance with one or more embodiments of the present disclosure. A customer may call into the call center of an entity, such as a financial institution. The customer's voice may be received by the call center over a voice channel of a communication network to interact 105 with one or more call center agents. The customer speech in the voice channel may then be converted 110 into text. The customer-generated text may then be routed 115 to computing devices 120_1, 120_2, 120_3, . . . 120_n in the computing system of the entity to n agents, respectively, where n is an integer. The n agents are denoted AGENT1, AGENT2, AGENT3, . . . AGENTn. On the n computing devices of the n agents may be displayed n-chat interfaces denoted CHAT1, CHAT2, |CHAT3, . . . CHATn for the n agents to communicate with the customer.

In some embodiments, on each computing device for a given agent, multiple chat interfaces may be displayed for the given agent to interact respectively with multiple customers. In other embodiments, the text interaction of the multiple customers may be displayable in a single chat interface, where the chat interface has selection capabilities to allow the call center agent to select a customer from multiple customers calling into the call center by allowing the call center agent to select which customer interaction to manage in the single chat interface.

The computing system may route the call to a first call center agent for the initial interaction with the customer. The first call center agent may then read the customer-generated text data in the respective chat interface of the agent computing device highlighting the problems or issues that the customer wants resolved. The first call center may respond to the customer via the chat interface by typing or entering text into the chat interface. The agent-generated text of the first call center may then be converted 125 to speech so as to generate a voice of a computer-generated agent which the customer hears 130 over the voice channel. In other embodiments, the first call center agent may not have the information to resolve the customer's issues and may decide to request that a second call center agent manage the interaction with the customer.

Direct voice communication between a call center agent with the customer is slow and expensive particularly when having to transfer the interaction to from the first call center agent to a second call center agent, particularly when the first call center agent may need to update the second call center agent with information regarding the customer's concern. Additionally, the customer may need to wait long periods of time for the information regarding the customer call session to be transcribed by the call center agent (e.g., annotated in customer call logs) or when company procedure establishes that a disclosure to be read by the call center agent to the customer over the voice channel. Every time the customer is handed off to a different agent, the customer may need to start telling the new agent as to why the customer is calling into the call center of the entity from the start, which may be frustrating to the customer.

The embodiments of the present disclosure described herein technically provide a solution to the problem of efficiently managing customer interactions in a call center. By converting the agent interaction with the customer to a chat interaction, the agent may use a variety of tools in the chat interface to rapidly access large amounts of information (e.g., from a database of the entity) quickly to solve the customer's problems. Additionally, the chat interface may also include features to allow a single call center agent to efficiently handle multiple customers interactions simultaneously. Furthermore, the handoff of the customer call session from a first agent to second agent may be performed seamlessly with the customer not even aware that the first agent may be updating the second agent by chat via the chat interface to continue the interaction with the customer.

Figure 2:
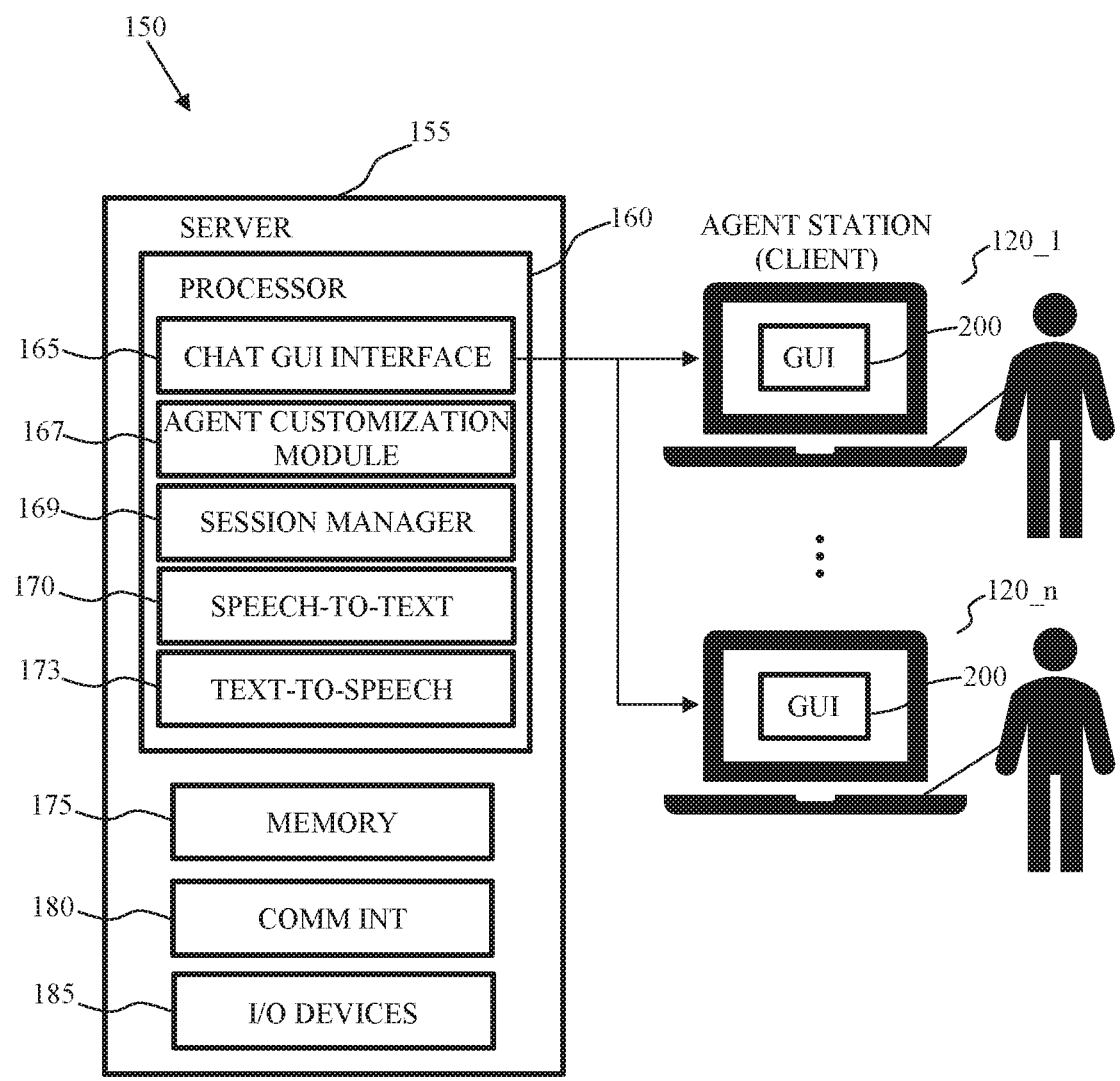
FIG. 2 illustrates a block diagram of a system with a server used for automated assisting of telephone agent services, in accordance with one or more embodiments of the present disclosure.

FIG. 2 illustrates a block diagram of a system 150 with a server 155 used for automated assisting of telephone agent services, in accordance with one or more embodiments of the present disclosure. The computing system for the automated assisting of telephone agent services may be implemented by server 155. Server 155 may communicate over a communication network with n computing devices 120_1 . . . 120_n respectively of the n call center agents. The computing devices are shown in FIG. 2 as computing stations for the call center agents that may include a chat interface 200 represented by a graphic user interface (GUI) on the display of the cell center agent (client) computing stations. In other embodiments, server 155 may include a cloud server implementing cloud computing services.

Server 155 may include a processor 160, a memory 175, input/output devices 185, and communication circuitry and interface 180 for communication with any of the agent computing devices 120_1 . . . 120_n over a communication network. Agent computing devices 120_1 . . . 120_n may similarly include (not shown in FIG. 2) a processor, a memory, input/output devices, and communication circuitry and interface for communication with server 155, for example.

Processor 160 may be configured to execute code of the following software modules for performing the tasks taught by the embodiments as described herein. A chat (GUI) interface module 163 may manage all of the functions for displaying chat interface 200 on any of the displays of the agent computing devices 120_1 . . . 120_n.

An agent customization module 167 may be used to allow the customer to customize a name or a voice of the computer-generated agent. The customer may choose the name and the voice of a favorite actor or singer, for example, as the computer-generated agent. Thus, the customer through the entire customer call session may perceive that the customer is interacting with one call center agent. Allowing the customer to customize the agent may provide a better call center experience since the customer may experience the same computer-generated agent every time the customer calls into the call center of the entity.

A speech-to-text module 170 may convert the speech or voice of the customer over the voice channel into customer-originated text that may displayed in chat interface 200. Speech-to-text module 170 may use any suitable speech-to-text transcription engines to convert the audio stream over the voice channel of the speech of the customer into the customer-originated text. Similarly, a text-to-speech module 173 may convert the call center agent-originated text into speech of the computer-generated agent using any suitable text-to-speech algorithms or engines. Additionally, and/or alternatively, speech-to-text module 170 and/or text-to-speech module 173 may include language translation capabilities between any multiple different languages.

The embodiments taught herein are not limited to speech-to-text interactions (and vice versa) between the customer interacting with multiple agents during the customer call session. In some embodiments, the customer may also communicate with the agents using SMS messages (short messaging service) messages and/or MMS messages (multimedia messaging service) in addition to voice communications.

In some embodiments, a session manager module 169 may manage the different agents coming in and out of the customer call session with the customer. In other embodiments, session manager module 169 may manage multiple customers in respective multiple call sessions interacting with multiple different agents over multiple communication channels such as voice, SMS and/or MMS.

Figure 3:
FIG. 3 illustrates an exemplary chat interface of multiple call center agents interacting with a customer, in accordance with one or more embodiments of the present disclosure.

FIG. 3 illustrates exemplary chat interface 200 of multiple call center agents 120_1 . . . 120_n interacting with a customer, in accordance with one or more embodiments of the present disclosure. An exemplary scenario is illustrated in FIG. 3 whereby a customer may call into a call center of a bank in order to activate a credit card issued by the bank.

In some embodiments, chat interface 200 may generally include any number of windows, each window assigned with any suitable functionality. In the exemplary scenario shown in FIG. 3, chat interface 200 may include six windows: (1) A first window 205 may include the customer-originated text from the speech of the customer converted to the customer-originated text. (2) A second window 210 may include merged texts respectively entered or typed into second window 210 by the one or more call center agents. In some embodiments, the merged agent-originated texts may be displayed as a group chat including the one or more call agents chatting with the customer. (3) A third window 215 may include a list of available agents and their job function in the bank. (4) A fourth window 220 may include a list 250 of types of accounts managed by the bank. (5) A fifth window 225 may include the customer's private details viewable by the call center agent. (6) A sixth window 230 may include any agent annotations, or any notes that the agents wish to enter regarding the agent's interaction with the customer.

The exemplary scenario of a customer wishing to activate a credit card as illustrated in FIG. 3 may proceed as follows: The customer calls into the call center and a customer call session established. The customer call session may be assigned to a first call agent—Agent 21. The customer, upon hearing that the bank answered the call, says "Hello" which is converted to text by speech-to-text module 170 and displayed to Agent 21 in first window 205. Agent 21 enters text 238 into second window 210 "Hello, how can I help you" which is relayed back to the customer as speech for the customer to hear.

The customer, John Smith, says into the voice channel that he wishes to activate his credit card, which is converted to text. Agent 21 may decide to relay the customer call session to an available agent suitable for handling credit card issues. Agent 21 may identify in third window 215 that Agent 2 is available and works in the Credit Card Department 240. Agent 21 may invite Agent 2 to participate in the customer call session by pressing the INVITE button 245 next to the Agent 2 entry in third window 215. In pressing the INVITE button by agent 21, chat GUI interface module 165 may generate a request to AGENT 2 to participate in the customer call session. AGENT 2 may receive a notification in chat interface 200 displayed on the computing device of AGENT 2 with a button to accept request, for example. Upon the accepting request, processor 160 may allow Agent 2 to participate in the customer call session by allowing Agent 2 to enter or type text into second window 210.

In some embodiments, processor 160 may identify that the customer is calling from a telephone number registered in the customer's profile stored in a database by the bank, for example, in memory 175. Processor 160 may be automatically configured to enter an automated message 242 into second window 210 via computer-generated speech synthesized by text-to-speech module 173 which notifies the customer that customer's credit card was recognized by the telephone number. Agent 2 may request the customer to speak the last four digits of the card number and the customer's social security number. The call center agent may view in fifth window 225 the customer's details to verify the requested last four digits of the credit number and/or the social security number that the customer provided.

In some embodiments. the call center agent may view fourth window 220 a list 252 of possible credit card actions, for example. The call center agent may find the procedure for card activation in list 252. The card activation procedure may include, for example, asking 254 the customer for a copy of the driver license to provide the bank with a higher level of identity verification before activating the credit card. Thus, processor 160 may be configured to automatically request 254_A via the computerized agent speech voice from the credit card holder to upload a photo of the customer's identification such as a driver's license.

Hence, another technical feature of the embodiments of the present disclosure as taught here is that processor 160 may send a link to the customer's smartphone and/or the customer's e-mail address instructing the customer to upload the document by clicking on the link. In some embodiments, processor 160 may be configured to only accept the requested document sent by the customer when the document is sent by the customer clicking on the link in the e-mail address and/or in the SMS message sent to the cell phone number registered in the customer profile.

In the exemplary scenario shown in FIG. 3, once the customer uploads the requested document, e.g., the customer's driver license, a uploaded file 254_B may be displayed in first window 205 for the call center agent to examine. When the call center agent validates the driver license document, the call center agent may ask the customer for authorization to activate the card and upon pasting 256_A the credit card activation disclosure into second window 210, the text of the credit card activation disclosure is read to the customer as synthesized speech as the credit card is activated as indicated by an automated message 258, as if a live call center agent would be reading the credit card activation disclosure to the customer.

In some embodiments, any of the call center agents having interacted with the customer via the chat interface may be able to annotate the chat history of the customer call session. In the exemplary scenario shown in FIG. 3, AGENT 2 may annotate in sixth window 230 that the credit card was successfully activated with no issues, for example.

In some embodiments, chat interface 200 of a customer call session with a particular customer with the customer-originated text and/or the call center agent-originated text of agents responding to the customer may be viewable by all call center agents at any time. In other embodiments, only call center agents having accepted (after being invited) to interact with the customer may be able to observe the chats between previous agents and the customer, where chat interface 200 displays a group chat of all the agents having interacting with the customer.

In some embodiments, processor 160 may synthesize the text and/or merged text from the one or more call center agents in second window 210 (e.g., group chat) to computer-generated agent speech in real time into audio stream as the one or more agent enters text into second window 210 for the customer to hear over the voice channel. Note that the first audio stream may be used in the present disclosure to differentiate customer speech from the second audio stream with the synthesized speech from the combined agent-originated text generated from the merged text provided by the one or more agents.

The exemplary scenario and chat interface shown in FIG. 3 and described herein above are merely for conceptual and visual clarity of the embodiments taught herein and not by way of limitation of the embodiments of the present disclosure whatsoever. The embodiments are not limited to a customer calling into a bank to activate a credit card, but may be used for any entity and for any suitable issue that a customer may wish to discuss with a call center agent of the entity, such as problems with goods and/or services that the entity may provide to the customer, for example. Moreover, the technical features shown in the exemplary scenario, such as handing off of the customer call session between multiple call center agents, or the customer being sent a link to upload pictures and/or documents using the telephone number and/or e-mail address as verification data before the file is uploaded into the chat interface, may be equally applicable to any customer-agent interaction scenario.

Chat interface 200 may include any number of windows with any suitable functionality for the call center agents to use during the customer call session. The windows may be arranged in any suitable order for displaying the customer-originated text generated customer's voice such as in vertically stacked windows and/or side windows within chat interface 200. Chat text may be entered by any number of call center agents into one or any number of windows in chat interface 200. Any of the windows may be configured to provide predetermined responses or predetermined information to the call center agents.

In some embodiments, the predetermined responses and/or predetermined information may be used by the call center agents for pasting (e.g., by dragging and dropping) predefined text 256_A into chat interface 200. In the exemplary scenario shown, the predetermined responses and/or predetermined information were used, for example, in relaying predefined disclosures to the customer in second window 210 prior to card activation, and/or account information such as transaction history and/or account status, for example, without the call center agent having to read this information to the customer, which is inefficient.

In some embodiments, the customer may be in one country speaking a first language when calling into the call center. One or more agents may be located in multiple different countries, each speaking multiple different languages. Processor 160 may be configured to translating the speech spoken in a language of the customer to text in the multiple different languages of the one or more agents in the multiple different countries. The text for display in the chat interfaces of the one or more agents may be in languages different than that of the customer. Similarly, the text entered by the one or more agents into chat interface 200 in multiple different languages in response to addressing the customer's needs, for example, may be subsequently converted into speech in the language spoken by the customer.

Figure 4:
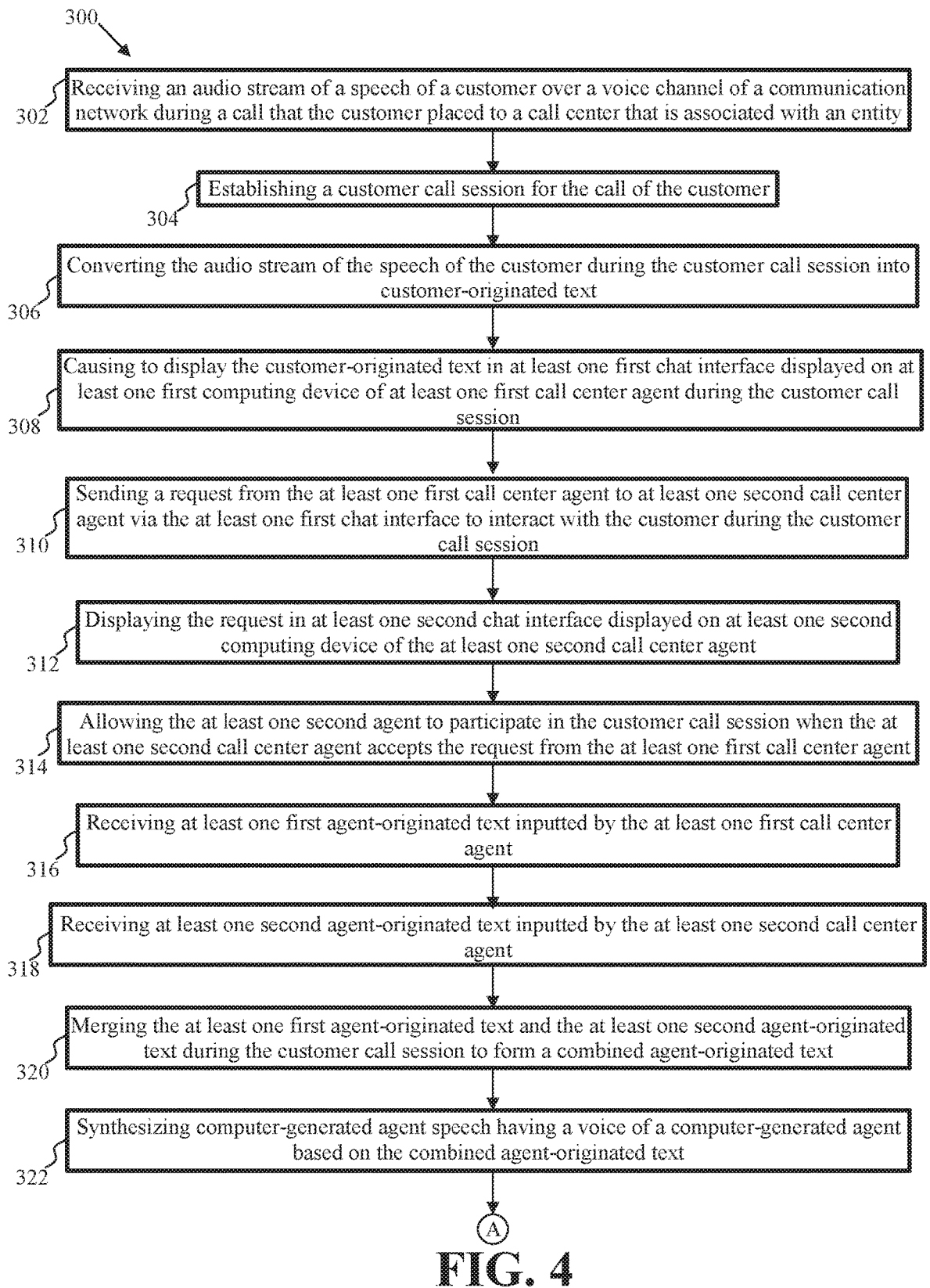
FIG. 4 illustrates a flowchart of an exemplary method for automated assisting of telephone agent services, in accordance with one or more embodiments of the present disclosure.
Figure 4:
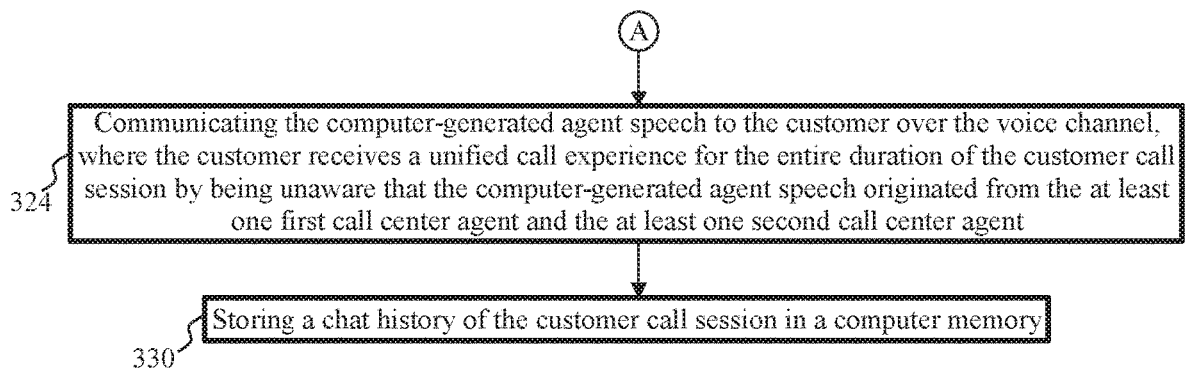

FIG. 4 illustrates a flowchart of an exemplary method 300 for automated assisting of telephone agent services, in accordance with one or more embodiments of the present disclosure. Having illustrated many technical features of the embodiments taught herein in the exemplary scenario for credit card activation, method 300 describes here the how the embodiments may be applied to any interactions between the customer and one or more call center agent. Method 300 may be performed by processor 160 of server 155. The embodiments herein describe sending a request from at least one first call center agent to at least one second call center agent to account for the handing off of the customer call to multiple different call agents during the entire duration of the customer call session.

Method 300 may include receiving 302 an audio stream of a speech of a customer over a voice channel of a communication network during a call that the customer placed to a call center that is associated with an entity. Method 300 may include establishing 304 a customer call session for the call of the customer. Method 300 may include converting 306 the audio stream of the speech of the customer during the customer call session into customer-originated text such as using speech-to-text module 170.

Method 300 may include causing 308 to display the customer-originated text in at least one first chat interface displayed on at least one first computing device of at least one first call center agent during the customer call session. Method 300 may include sending 310 a request from the at least one first call center agent to at least one second call center agent via the at least one first chat interface to interact with the customer during the customer call session. Sending the request may include the at least one call agent pressing INVITE button 245 on call interface 200.

Method 300 may include displaying 312 the request in at least one second chat interface (e.g., chat interface 200) displayed on at least one second computing device of the at least one second call center agent. Method 300 may include allowing 314 the at least one second agent to participate in the customer call session when the at least one second call center agent accepts the request from the at least one first call center agent.

In some embodiments, accepting the request by the at least one second agent in response to the at least one first agent pressing the INVITE button may include the at least one second agent pushing "ACCEPT" in a pop up window appearing on the computing device of the at least one second agent, or entering or typing text, such as "I accept", for example, in a window of chat interface 200.

Method 300 may include receiving 316 at least one first agent-originated text inputted by the at least one first call center agent. Method 300 may include receiving 318 at least one second agent-originated text inputted by the at least one second call center agent. Method 300 may include merging 320 the at least one first agent-originated text and the at least one second agent-originated text during the customer call session to form a combined agent-originated text. Method 300 may include synthesizing 322 computer-generated agent speech having a voice of a computer-generated agent based on the combined agent-originated text.

Method 300 may include communicating 324 the computer-generated agent speech to the customer over the voice channel, where the customer receives a unified call experience for the entire duration of the customer call session by being unaware that the computer-generated agent speech originated from the at least one first call center agent and the at least one second call center agent. Method 300 may include storing 330 a chat history of the customer call session in computer memory 175.

FIG. 5 illustrates an exemplary chat history 340 of interaction between multiple call center agents and a customer via chat interface 200, in accordance with one or more embodiments of the present disclosure. Merely by way of example and conceptual clarity, and not by way of limitation of the embodiments taught herein, exemplary chat history 340 as shown in FIG. 5 may include a transcript of the exemplary scenario for activating a credit card shown in FIG. 3.

In some embodiments, chat history 340 may include any transcripts of customer-originated text and/or the call center agent-originated text occurring in the entire or a portion of the duration of the customer call session. In other embodiments, processor 160 may time-sequentially merge the customer-originated text and the call center agent-originated texts to generate chat history 340. In yet other embodiments, the chat history may include annotations made by any of the call center agents that interacted with the customer during the customer call session.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other. Communication circuitry and interface 180 may support any of the above mentioned communication protocols, for example.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
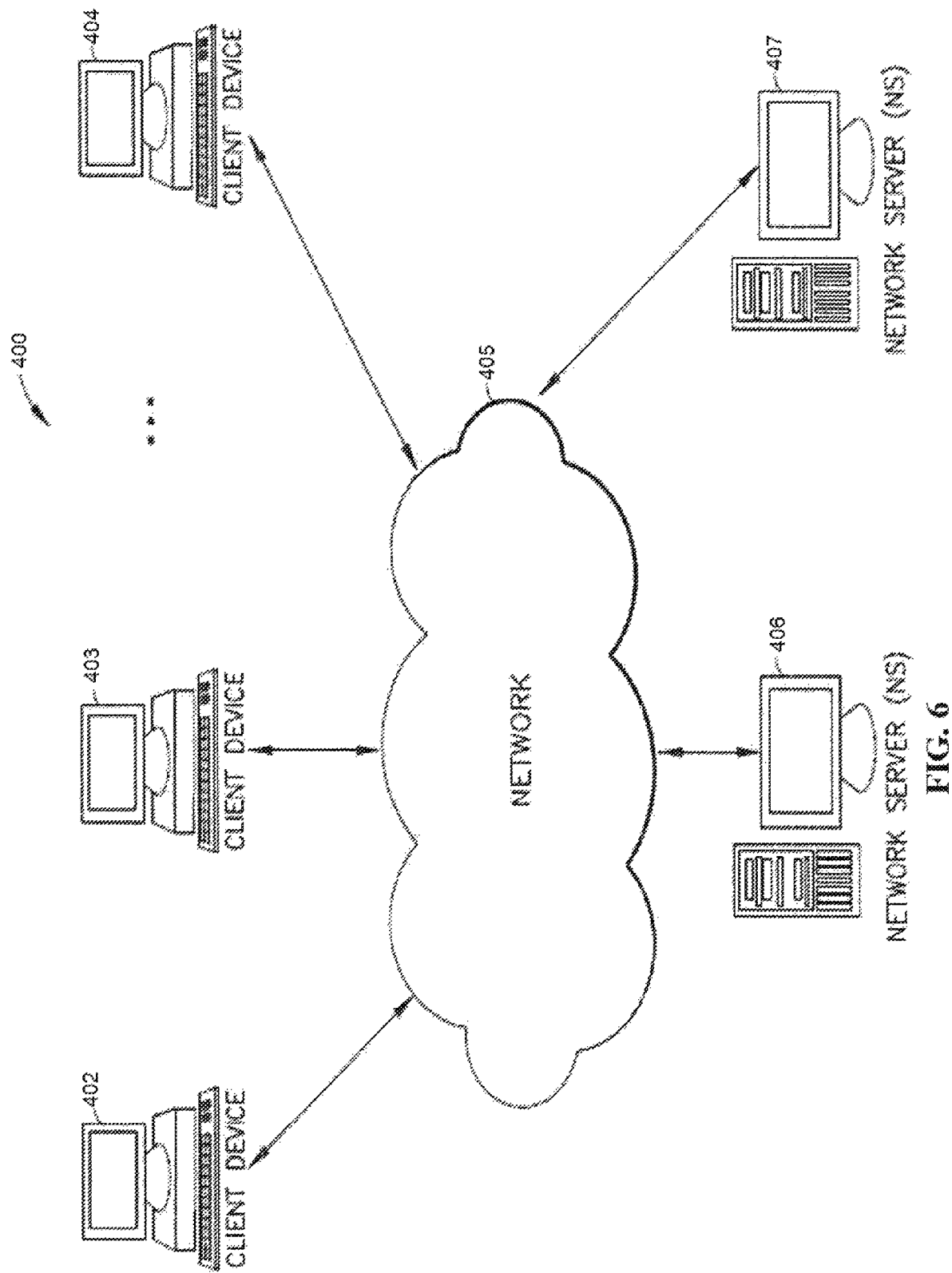
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 105, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
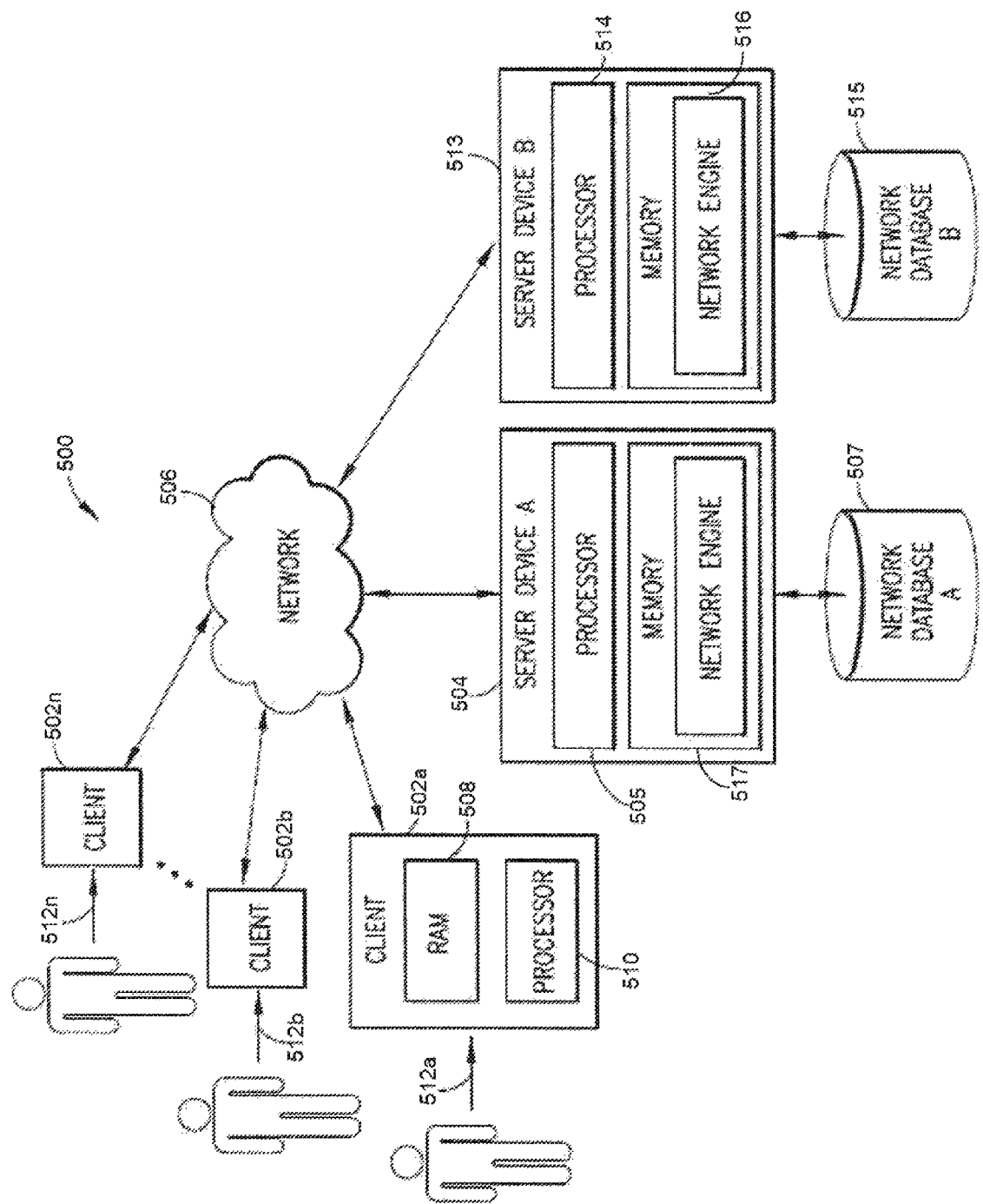
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a-n may also comprise a number of external or internal devices such as a mouse, a CD-ROM, DVD, a physical or virtual keyboard, a display, or other input or output devices (e.g., input/output devices 185). In some embodiments, examples of member computing devices 502a-n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a-n may be specifically programmed with one or more application programs in accordance with one or more principles/methodologies detailed herein. In some embodiments, member computing devices 502a-n may operate on any operating system capable of supporting a browser or browser-enabled application, such as Microsoft™, Windows™, and/or Linux. In some embodiments, member computing devices 502a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a-n, users, 512a-n, may communicate over the exemplary network 206 with each other and/or with other systems and/or devices coupled to the network 506. As shown in FIG. 7, exemplary server devices 504 and 513 may be also coupled to the network 506. In some embodiments, one or more member computing devices 502a-n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
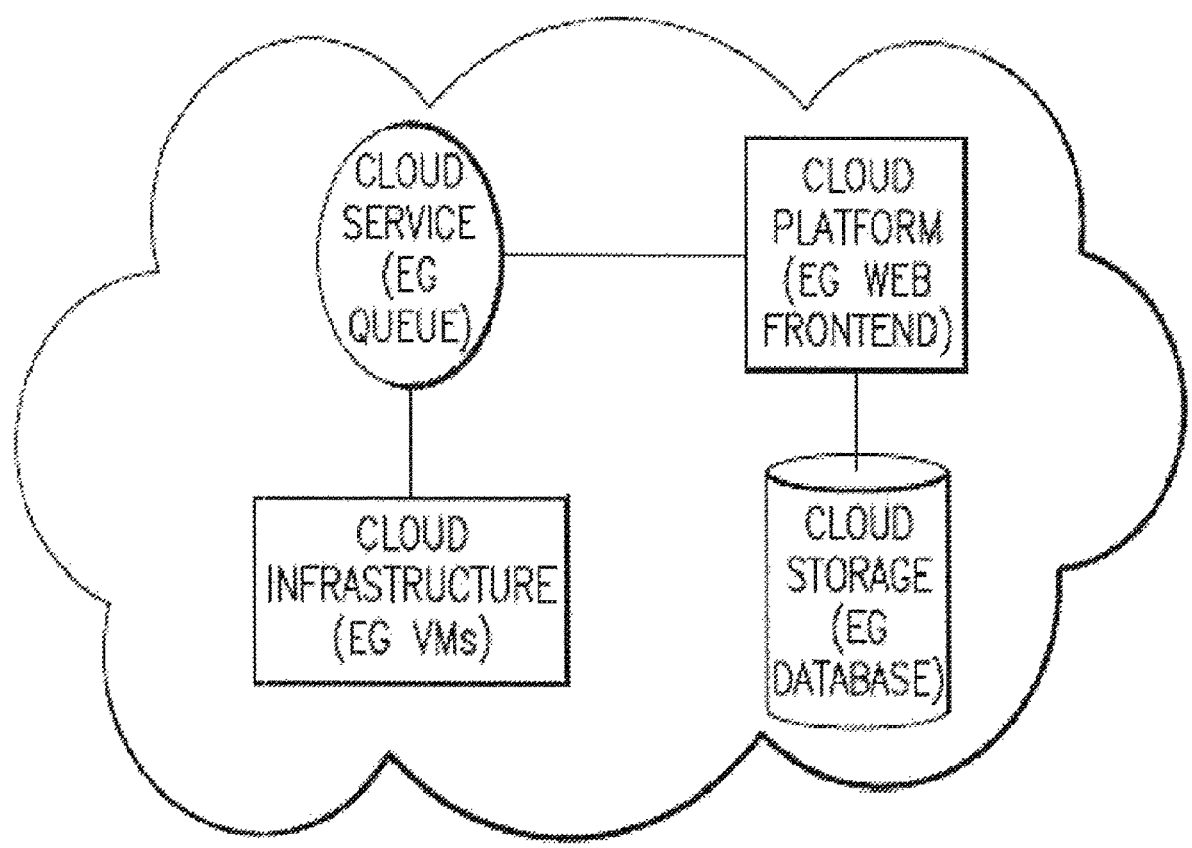
FIGS. 8 and 9 are diagrams illustrating implementations of cloud computing architecture/aspects with respect to which the disclosed technology may be specifically configured to operate, in accordance with one or more embodiments of the present disclosure.
Figure 9:
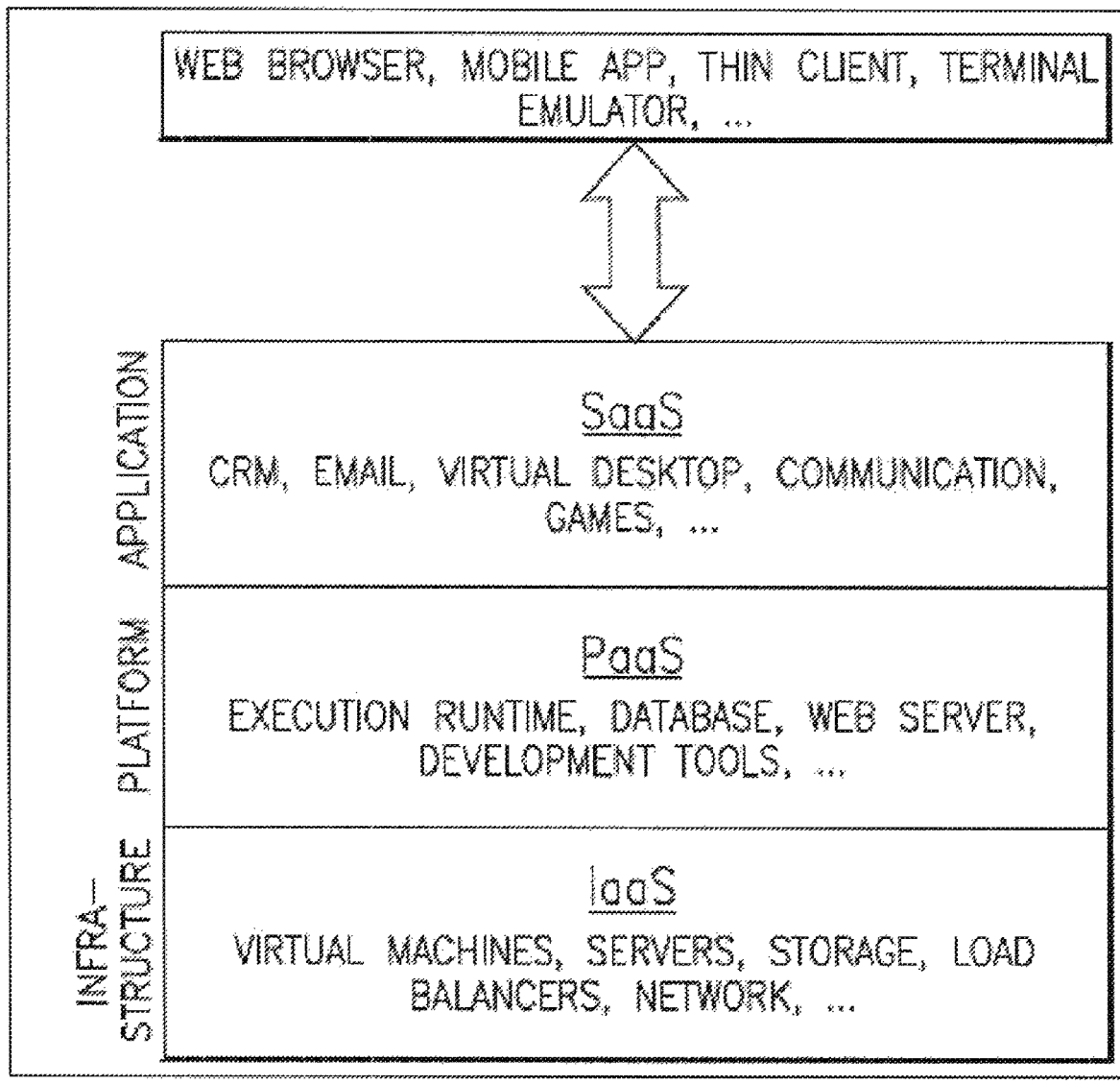

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, a system may include a computer memory and a processor. The processor may be configured to:

receive an audio stream of a speech of a customer over a voice channel of a communication network during a call that the customer placed to a call center that is associated with an entity;

establish a customer call session for the call of the customer;

convert the audio stream of the speech of the customer during the customer call session into customer-originated text;

cause to display the customer-originated text in at least one first chat interface displayed on at least one first computing device of at least one first call center agent during the customer call session;

send a request from the at least one first call center agent to at least one second call center agent via the at least one first chat interface to interact with the customer during the customer call session;

display the request in at least one second chat interface displayed on at least one second computing device of the at least one second call center agent;

allow the at least one second agent to participate in the customer call session when the at least one second call center agent accepts the request from the at least one first call center agent;

receive at least one first agent-originated text inputted by the at least one first call center agent;

receive at least one second agent-originated text inputted by the at least one second call center agent;

merge the at least one first agent-originated text and the at least one second agent-originated text during the customer call session to form a combined agent-originated text;

synthesize computer-generated agent speech having a voice of a computer-generated agent based on the combined agent-originated text;

communicate the computer-generated agent speech to the customer over the voice channel, where the customer receives a unified call experience for the entire duration of the customer call session by being unaware that the computer-generated agent speech originated from the at least one first call center agent and the at least one second call center agent; and store, in the computer memory, a chat history of the customer call session.

The system according to claim 1, wherein the processor is configured to convert the speech of the customer into text by translating the speech spoken in a language of the customer to text in a different language for display on the at least one first chat interface or the at least one second chat interface.

In some embodiments, the processor may be configured to synthesize the speech of the voice of the computer-generated agent by converting the text entered into the at least one first chat interface or the at least one second chat interface in multiple languages by the at least one first call center agent or the at least one second call center agent into speech with a language spoken by the customer.

In some embodiments, each chat interface from the at least one first chat interface and the at least one second chat interface may include a first window for displaying the customer-originated text from the converted speech of the customer, and a second window for displaying the combined agent-originated text to be converted to the computer-generated agent speech having the voice of the computer-generated agent for communication with the customer over the voice channel.

In some embodiments, each chat interface from the at least one first chat interface and the at least one second chat interface may include a third window with text of predetermined responses or predetermined information that may be copied into the second window for automatically generating the computer-generated agent speech from the predetermined responses or predetermined information for the customer to hear over the voice channel.

In some embodiments, the processor may be configured to allow the customer to customize a name or the voice of the computer-generated agent.

In some embodiments, the processor may be configured to relay a request to the customer from the at least one first call center agent or the at least one second call center agent to send a file or a text message over the communication network to the entity.

In some embodiments, the processor may be configured to accept the file or the text message from the customer in response to the request when verifying the identity of the customer based on a telephone number or an e-mail address of the customer stored in a customer profile.

In some embodiments, the processor may be configured to display the accepted file or text message to the at least one first call center agent or the at least one second call center agent in the chat interface in their respective chat interface.

In some embodiments, the processor may be configured to display the request in the at least one second chat interface on the display of the at least one second agent for the at least one second agent to interact with the customer when the at least one first agent presses an invite button in the at least one first chat interface.

In some embodiments, a method may include:

receiving, by a processor, an audio stream of a speech of a customer over a voice channel of a communication network during a call that the customer placed to a call center that is associated with an entity;

establishing, by the processor, a customer call session for the call of the customer;

converting, by the processor, the audio stream of the speech of the customer during the customer call session into customer-originated text;

causing, by the processor, to display the customer-originated text in at least one first chat interface displayed on at least one first computing device of at least one first call center agent during the customer call session;

sending, by the processor, a request from the at least one first call center agent to at least one second call center agent via the at least one first chat interface to interact with the customer during the customer call session;

displaying, by the processor, the request in at least one second chat interface displayed on at least one second computing device of the at least one second call center agent;

allowing, by the processor, the at least one second agent to participate in the customer call session when the at least one second call center agent accepts the request from the at least one first call center agent;

receiving, by the processor, at least one first agent-originated text inputted by the at least one first call center agent;

receiving, by the processor, at least one second agent-originated text inputted by the at least one second call center agent;

merging, by the processor, the at least one first agent-originated text and the at least one second agent-originated text during the customer call session to form a combined agent-originated text;

synthesizing, by the processor, computer-generated agent speech having a voice of a computer-generated agent based on the combined agent-originated text;

communicating, by the processor, the computer-generated agent speech to the customer over the voice channel, where the customer receives a unified call experience for the entire duration of the customer call session by being unaware that the computer-generated agent speech originated from the at least one first call center agent and the at least one second call center agent; and storing, by the processor in a computer memory, a chat history of the customer call session.

In some embodiments, converting the speech of the customer into text may include translating the speech spoken in a language of the customer to text in a different language for display on the at least one first chat interface or the at least one second chat interface.

In some embodiments, synthesizing the speech of the voice of the computer-generated agent may include converting the text entered into the at least one first chat interface or the at least one second chat interface in multiple languages by the at least one first call center agent or the at least one second call center agent into speech with a language spoken by the customer.

In some embodiments. each chat interface from the at least one first chat interface and the at least one second chat interface may include a first window for displaying the customer-originated text from the converted speech of the customer, and a second window for displaying the combined agent-originated text to be converted to the computer-generated agent speech having the voice of the computer-generated agent for communication with the customer over the voice channel.

In some embodiments. each chat interface from the at least one first chat interface and the at least one second chat interface may include a third window with text of predetermined responses or predetermined information that may be copied into the second window for automatically generating the computer-generated agent speech from the predetermined responses or predetermined information for the customer to hear over the voice channel.

In some embodiments, the method may include allowing, by the processor, the customer to customize a name or the voice of the computer-generated agent.

In some embodiments, the method may include relaying, by the processor, a request to the customer from the at least one first call center agent or the at least one second call center agent to send a file or a text message over the communication network to the entity.

In some embodiments, the method may include accepting, by the processor, the file or the text message from the customer in response to the request when verifying the identity of the customer based on a telephone number or an e-mail address of the customer stored in a customer profile.

In some embodiments, the method may include displaying, by the processor, the accepted file or text message to the at least one agent in the chat interface.

In some embodiments, displaying the request in the at least one second chat interface on the display of the at least one second agent for the at least one second agent to interact with the customer may include displaying the request when the at least one first agent presses an invite button in the at least one first chat interface.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A system comprising:

a computer memory;

a processor configured to:

receive an audio stream of a speech of a customer over a voice channel of a communication network during a call that the customer placed to a call center that is associated with an entity;

establish a customer call session for the call of the customer;

convert the audio stream of the speech of the customer during the customer call session into customer-originated text;

cause to display the customer-originated text in at least one first chat interface displayed on at least one first computing device of at least one first call center agent during the customer call session;

send a request from the at least one first call center agent to at least one second call center agent via the at least one first chat interface to interact with the customer during the customer call session;

display the request in at least one second chat interface displayed on at least one second computing device of the at least one second call center agent;

allow the at least one second agent to participate in the customer call session when the at least one second call center agent accepts the request from the at least one first call center agent;

receive at least one first agent-originated text inputted by the at least one first call center agent;

receive at least one second agent-originated text inputted by the at least one second call center agent;

merge the at least one first agent-originated text and the at least one second agent-originated text during the customer call session to form a combined agent-originated text;

synthesize computer-generated agent speech having a voice of a computer-generated agent based on the combined agent-originated text;

communicate the computer-generated agent speech to the customer over the voice channel, wherein the customer receives a unified call experience for the entire duration of the customer call session by being unaware that the computer-generated agent speech originated from the at least one first call center agent and the at least one second call center agent; and store, in the computer memory, a chat history of the customer call session.

2. The system according to claim 1, wherein the processor is configured to convert the speech of the customer into text by translating the speech spoken in a language of the customer to text in a different language for display on the at least one first chat interface or the at least one second chat interface.

3. The system according to claim 1, wherein the processor is configured to synthesize the speech of the voice of the computer-generated agent by converting the text entered into the at least one first chat interface or the at least one second chat interface in multiple languages by the at least one first call center agent or the at least one second call center agent into speech with a language spoken by the customer.

4. The system according to claim 1, wherein each chat interface from the at least one first chat interface and the at least one second chat interface comprises a first window for displaying the customer-originated text from the converted speech of the customer, and a second window for displaying the combined agent-originated text to be converted to the computer-generated agent speech having the voice of the computer-generated agent for communication with the customer over the voice channel.

5. The system according to claim 4, wherein each chat interface from the at least one first chat interface and the at least one second chat interface comprises a third window with text of predetermined responses or predetermined information that may be copied into the second window for automatically generating the computer-generated agent speech from the predetermined responses or predetermined information for the customer to hear over the voice channel.

6. The system according to claim 1, wherein the processor is configured to allow the customer to customize a name or the voice of the computer-generated agent.

7. The system according to claim 1, wherein the processor is configured to relay a request to the customer from the at least one first call center agent or the at least one second call center agent to send a file or a text message over the communication network to the entity.

8. The system according to claim 7, wherein the processor is configured to accept the file or the text message from the customer in response to the request when verifying the identity of the customer based on a telephone number or an e-mail address of the customer stored in a customer profile.

9. The system according to claim 8, wherein the processor is configured to display the accepted file or text message to the at least one first call center agent or the at least one second call center agent in the chat interface in their respective chat interface.

10. The system according to claim 1, wherein the processor is configured to display the request in the at least one second chat interface on the display of the at least one second agent for the at least one second agent to interact with the customer when the at least one first agent presses an invite button in the at least one first chat interface.

11. A method comprising:

receiving, by a processor, an audio stream of a speech of a customer over a voice channel of a communication network during a call that the customer placed to a call center that is associated with an entity;

establishing, by the processor, a customer call session for the call of the customer;

converting, by the processor, the audio stream of the speech of the customer during the customer call session into customer-originated text;

causing, by the processor, to display the customer-originated text in at least one first chat interface displayed on at least one first computing device of at least one first call center agent during the customer call session;

sending, by the processor, a request from the at least one first call center agent to at least one second call center agent via the at least one first chat interface to interact with the customer during the customer call session;

displaying, by the processor, the request in at least one second chat interface displayed on at least one second computing device of the at least one second call center agent;

allowing, by the processor, the at least one second agent to participate in the customer call session when the at least one second call center agent accepts the request from the at least one first call center agent;

receiving, by the processor, at least one first agent-originated text inputted by the at least one first call center agent;

receiving, by the processor, at least one second agent-originated text inputted by the at least one second call center agent;

merging, by the processor, the at least one first agent-originated text and the at least one second agent-originated text during the customer call session to form a combined agent-originated text;

synthesizing, by the processor, computer-generated agent speech having a voice of a computer-generated agent based on the combined agent-originated text;

communicating, by the processor, the computer-generated agent speech to the customer over the voice channel, wherein the customer receives a unified call experience for the entire duration of the customer call session by being unaware that the computer-generated agent speech originated from the at least one first call center agent and the at least one second call center agent; and storing, by the processor in a computer memory, a chat history of the customer call session.

12. The method according to claim 11, wherein converting the speech of the customer into text comprises translating the speech spoken in a language of the customer to text in a different language for display on the at least one first chat interface or the at least one second chat interface.

13. The method according to claim 11, wherein synthesizing the speech of the voice of the computer-generated agent comprises converting the text entered into the at least one first chat interface or the at least one second chat interface in multiple languages by the at least one first call center agent or the at least one second call center agent into speech with a language spoken by the customer.

14. The method according to claim 11, wherein each chat interface from the at least one first chat interface and the at least one second chat interface comprises a first window for displaying the customer-originated text from the converted speech of the customer, and a second window for displaying the combined agent-originated text to be converted to the computer-generated agent speech having the voice of the computer-generated agent for communication with the customer over the voice channel.

15. The method according to claim 14, wherein each chat interface from the at least one first chat interface and the at least one second chat interface comprises a third window with text of predetermined responses or predetermined information that may be copied into the second window for automatically generating the computer-generated agent speech from the predetermined responses or predetermined information for the customer to hear over the voice channel.

16. The method according to claim 11, further comprising allowing, by the processor, the customer to customize a name or the voice of the computer-generated agent.

17. The method according to claim 11, further comprising relaying, by the processor, a request to the customer from the at least one first call center agent or the at least one second call center agent to send a file or a text message over the communication network to the entity.

18. The method according to claim 17, further comprising accepting, by the processor, the file or the text message from the customer in response to the request when verifying the identity of the customer based on a telephone number or an e-mail address of the customer stored in a customer profile.

19. The method according to claim 18, further comprising displaying, by the processor, the accepted file or text message to the at least one agent in the chat interface.

20. The method according to claim 11, wherein displaying the request in the at least one second chat interface on the display of the at least one second agent for the at least one second agent to interact with the customer comprises displaying the request when the at least one first agent presses an invite button in the at least one first chat interface.

\* \* \* \* \*